US007963254B2

(12) United States Patent
Patton

(10) Patent No.: US 7,963,254 B2
(45) Date of Patent: Jun. 21, 2011

(54) METHOD AND APPARATUS FOR THE AUTOMATIC IDENTIFICATION OF BIRDS BY THEIR VOCALIZATIONS

(75) Inventor: Charles M. Patton, Eugene, OR (US)

(73) Assignee: Pariff LLC, Eugene, OR (US)

( * ) Notice: Subject to any disclaimer, the term of this patent is extended or adjusted under 35 U.S.C. 154(b) by 359 days.

(21) Appl. No.: 12/126,773

(22) Filed: May 23, 2008

(65) Prior Publication Data
US 2008/0223307 A1    Sep. 18, 2008

Related U.S. Application Data

(62) Division of application No. 11/033,605, filed on Jan. 11, 2005, now Pat. No. 7,377,233.

(51) Int. Cl.
A01K 29/00    (2006.01)
H04R 29/00    (2006.01)
(52) U.S. Cl. .......................................... 119/712; 381/56
(58) Field of Classification Search ................. 119/712, 119/719; 704/270, 246; 340/573.2; 381/56; 369/96
See application file for complete search history.

(56) References Cited

U.S. PATENT DOCUMENTS

| | | | |
|---|---|---|---|
| 4,479,239 A | 10/1984 | Rhines | |
| 4,640,134 A | 2/1987 | Simmons | |
| 4,653,099 A | 3/1987 | Kanke et al. | |
| 4,806,931 A * | 2/1989 | Nelson | 340/907 |
| 4,876,721 A * | 10/1989 | Kerr et al. | 381/56 |
| 4,965,552 A * | 10/1990 | Price et al. | 340/566 |
| 5,056,145 A | 10/1991 | Yamamoto et al. | |
| 5,059,126 A | 10/1991 | Kimball | |
| 5,168,471 A * | 12/1992 | Parra | 367/99 |
| 5,168,830 A * | 12/1992 | Deglis | 119/428 |
| 5,404,422 A * | 4/1995 | Sakamoto et al. | 704/232 |
| 5,452,364 A * | 9/1995 | Bonham | 381/92 |
| 5,732,392 A | 3/1998 | Mizuno et al. | |
| 5,893,057 A * | 4/1999 | Fujimoto et al. | 704/246 |
| 5,956,463 A * | 9/1999 | Patrick et al. | 704/232 |
| 6,222,449 B1 | 4/2001 | Twining | |
| 6,396,402 B1 * | 5/2002 | Berger et al. | 340/573.2 |
| 6,396,954 B1 * | 5/2002 | Kondo | 382/224 |

(Continued)

FOREIGN PATENT DOCUMENTS

EP    0629996 A2    12/1994

(Continued)

OTHER PUBLICATIONS

Smyth, Tamara et al., The Syrinx: Nature's Hybrid Wind Instrument, 1st Pan-American/Iberian Meeting on Acoustics, Center for Computer Research in Music and Acoustics, Department of Music, Stanford University, 7 pages, Stanford, California, Dec. 2-7, 2002, Cancun, Mexico.

(Continued)

*Primary Examiner* — Yvonne R. Abbott
(74) *Attorney, Agent, or Firm* — Christie, Parker & Hale, LLP

(57) ABSTRACT

An apparatus for detecting and identifying birds based upon electronic analysis of their bird calls and songs and method for doing so by utilizing a step-by-step hierarchical method of breaking down bird vocalizations according to order, family, and species of the specific bird. Several embodiments of the apparatus are disclosed particularly a hand held computational device, microphone, audio capture card, user application software and a collection of prerecorded audio data.

6 Claims, 12 Drawing Sheets

U.S. PATENT DOCUMENTS

| | | | |
|---|---|---|---|
| 6,535,131 | B1 | 3/2003 | Bar-Shalom et al. |
| 6,546,368 | B1* | 4/2003 | Weninger et al. ............. 704/270 |
| 6,748,360 | B2 | 6/2004 | Pitman et al. |
| 7,065,416 | B2* | 6/2006 | Weare et al. .................... 700/94 |
| 2001/0054961 | A1 | 12/2001 | Twining |
| 2003/0125946 | A1 | 7/2003 | Hsu |
| 2004/0107104 | A1* | 6/2004 | Schaphorst .................. 704/270 |
| 2004/0150528 | A1 | 8/2004 | Natividade et al. |
| 2005/0100172 | A1* | 5/2005 | Schliep et al. ............... 381/71.4 |
| 2005/0228649 | A1* | 10/2005 | Harb et al. .................... 704/205 |
| 2005/0254663 | A1* | 11/2005 | Raptopoulos et al. ....... 381/71.1 |
| 2005/0281410 | A1* | 12/2005 | Grosvenor et al. ............. 381/61 |
| 2006/0256973 | A1* | 11/2006 | Kirsten et al. .................. 381/61 |
| 2006/0277037 | A1* | 12/2006 | Woodcock et al. ........... 704/208 |
| 2007/0110253 | A1* | 5/2007 | Anderson et al. ............... 381/61 |

FOREIGN PATENT DOCUMENTS

| | | |
|---|---|---|
| EP | 0629996 A3 | 12/1994 |
| WO | WO02/077898 A2 | 10/2002 |

OTHER PUBLICATIONS

Gardner, Tim, et al., Simple motor gestures for birdsong, Center for Studies in Physics and Biology, The Rockefeller University, 1230 York Ave., New York, NY, Departamento de Física, FCEN, UBA Ciudad Universitaria, Pab. 1, 4 pages (1428), Buenos Aires Argentina.

Smyth, Tamara et al., The Sounds of the Avian Syrinx—Are They Really Flute-Like?, Proc. of the 5th Int. Conference on Digital Audio Effects (DAFx-02), Hamburg, Germany, Center for Computer Research in Music and Acoustics, pp. 199-202Stanford University, Stanford, California, Sep. 26-28, 2002.

Smyth, Tamara, et al., The Estimation of Birdsong Control Parameters Using Maximum Likelihood and Minimum Action, Proceedings of the Stockholm Music Acoustics Conference, (SMAC 03), Stockholm, Sweden, Center for Computer Research in Music and Acoustics (CCRMA), 4 pages, Stanford University, Stanford, California, Aug. 6-9, 2003.

Elemans, Coen P.H., et al., Quantitative modelling of the biomechanics of the avian syrinx, Animal Biology, vol. 53, No. 2, pp. 183-193 (2003) © Koninkliijke Brill NV, Leiden, 2003.

Wilde, Mark, et al., Bird Call Recognition using Hidden Markov Models, EECS Department, Tulane University, 4 pages, New Orleans, LA 2003.

Somervuo, Panu, et al., Bird Song Recognition Based on Syllable Pair Histograms, Neural Networks Research Centre, and Laboratory of Acoustics and Audio Signal Processing, Helsinki University of Technology, Finland, 4 pages, (2000-2005).

Chesmore, E.D., et al., Automated identification of field-recorded songs of four British grasshoppers using bioacoustic signal recognition, Department of Electronics, University of York, Heslington, York, Biodiversity Research Group, Tohoku Research Center, Forestry and Forest Products Research Institute, Shimokuriyagawa aza Nabeyashiki 92-25, Morioka, Japan, Bulletin of Entomological Research (2004) 94, pp. 319-330.

McIlraith, Alex L., et al., Birdsong Recognition Using Backpropagation and Multivariate Statistics, IEEE Transactions on Signal Processing, vol. 45, pp. 2740-2748, No. 11, Nov. 1997.

Tchernichovski, Ofer, et al., A procedure for an automated measurement of song similarity, The Rockefeller University, Field Research Center, California Institute of Technology, Computation and Neural Systems, Bell Laboratories Lucent Technologies, 2000 The Association for the Study of Animal Behaviour 2000 59,pp. 1167-1176.

Nelson, Brian S., Dynamics of frequency and amplitude modulations in vocalizations produced by eastern towhees, *Pipilo erythrophthalmus*, Department of Biology, Indiana University, J. Acoust. Soc. Am. 115 (3), Mar. 2004, pp. 1333-1344, Bloomington, Indiana.

Banbrook, M. et al., Dynamical Modelling of Vowel Sounds as a Synthesis Tool, Department of Electrical Engineering, University of Edinburgh, 4 pages, Edinburgh, UK.

Tchernichovski, Ofer, et al, Dynamics of the Vocal Imitation Process: How a Zebra Finch Learns its Song, Research Article, Science, vol. 291, pp. 2564-2569, Field Research Center, The Rockefeller University, Millbrook, NY.

Fee, Michale S., et al., The role of nonlinear dynamics of the syrinx in the vocalizations of a songbird, Nature, vol. 395, pp. 67-71, Sep. 3, 1998, Nature © Macmillan Publishers Ltd. 1998.

Härmä, Aki, Automatic Identification of Bird Species Based on Sinusoidal Modeling of Syllables, Helsinki University of Technology, Laboratory of Acoustics and Audio Signal Processing, Finland, 4 pages.

Banbrook, Michael, Nonlinear Analysis of Speech From a Synthesis Perspective, A thesis submitted for the degree of Doctor of Philosophy, 22 pages, The University of Edinburgh, Oct. 15, 1996.

* cited by examiner

Fig 2
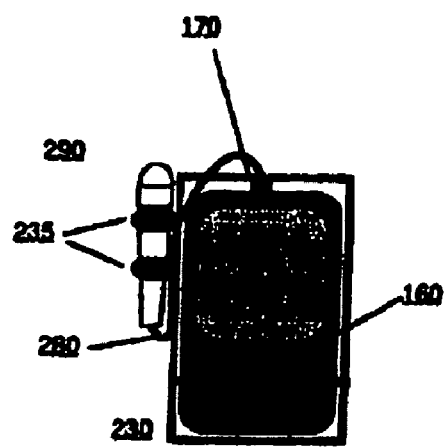
FRONT VIEW
FIG. 2A
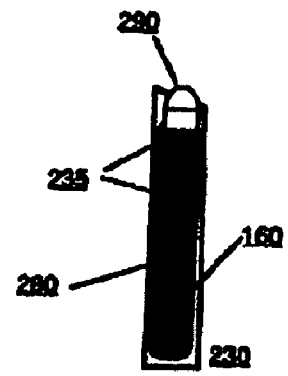
SIDE VIEW
FIG. 2B

Fig 5
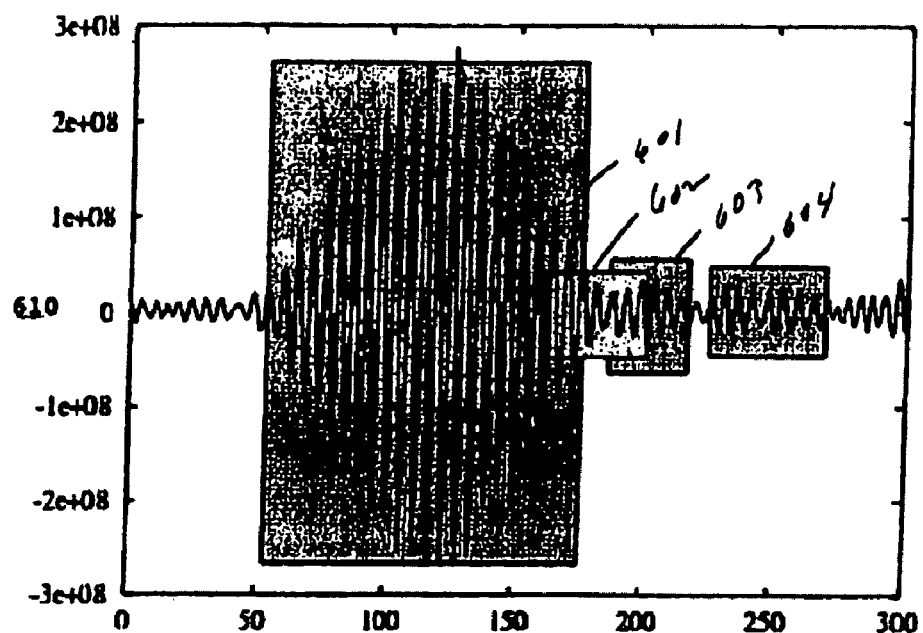
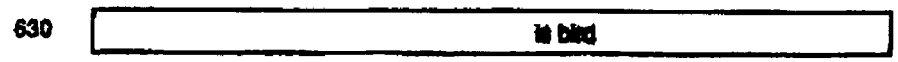
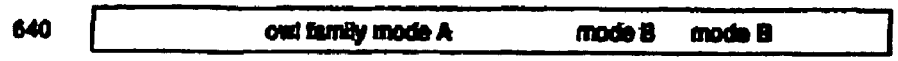

METHOD AND APPARATUS FOR THE AUTOMATIC IDENTIFICATION OF BIRDS BY THEIR VOCALIZATIONS

CROSS-REFERENCE TO RELATED APPLICATION(S)

This application is a divisional of application Ser. No. 11/033,605 filed Jan. 11, 2005 now U.S. Pat. No. 7,377,233, the disclosure of which is incorporated fully herein by reference.

SUMMARY OF THE INVENTION

Birding, that is the recreational activity of observing birds, is an increasingly popular pastime around the world. An important component of birding is the identification of the species of an observed bird. At least as important to the birder is the identification of the genus or family, of an observed bird, especially if the species is unknown. Of special importance to serious birders is aiding their accomplishment of learning to identify observed birds in the field.

To date, birders have had only field guides and recordings as personal aids for identifying and learning to identify birds. However, in no case do these aids actually determine an identification, they only provide comparative references and the judgment of whether a match is made or not is left entirely to the birder. Further, in no case is any feedback given on the quality or reliability of the match they have just made, Additionally, in the case of learning bird songs and calls, there is currently no practical way to precisely indicate to the learner which aspects of a particular bird's song are most relevant to the identification. In consequence, making progress in learning identification is slow at best.

More recently, there have been electronic versions of field guides created (sometimes including audio recordings) that speed the process of searching for a particular comparative reference. However, even with these more sophisticated approaches, the ultimate judgment about a match is left entirely to the birder and no feedback on the quality of their match is provided, or even possible.

For other birders, such as people who set out bird feeders in their backyard, the joy of knowing what birds have visited their yard is foremost and learning the skill of identifying the birds is not as important. For these birders, field guides and recordings, electronic or not, have another significant liability. This liability is that the birder must be actively engaged in birding at the time a bird shows up in their yard in order to make the identification. Every backyard birder will surely identify with the experience of noticing an interesting bird, perhaps by hearing its unusual song, and running to get a field guide only to discover that the bird has left by the time they get back to make the identification.

The current invention teaches how to overcome all the deficiencies noted above with an apparatus that automatically identifies birds by way of their vocalizations (calls and songs) and employs a novel method for doing so. Previous methods for attempting to identify birds by their vocalizations such as neural network, hidden Markov model, dynamic time warping, and other techniques, attempt to match an incoming bird vocalization against a library of exemplars using an overall similarity standard to determine a match. These techniques have not achieved notable success in resolving any of the deficiencies noted above.

The current invention takes a different approach. Instead of an overall similarity standard, the current invention, as described in detail below, employs a hierarchical method that largely parallels the neuro-physiological hierarchy of bird vocalizations. When this method is embodied in a very portable computing device, such as a personal digital assistant augmented with appropriate software and audio capture capability, this method allows the device to determine that a bird is singing, even if nothing else about the bird can be determined. Further, it allows the family of a bird to be determined, even if the species cannot be determined. Finally, it allows the species to be determined. Additionally, it provides for the time-based annotation of the bird song so that that the relative importance of each part of the song for the purpose of identification can be relayed to the birder to aid in their learning.

The current invention teaches how to embody such functionality in a hand-held computational device together with a microphone, an audio capture card or other means, a user application that runs on the device, and a library of vocalization characteristics that, because it resides on the audio capture card, is accessible to the application but generally inaccessible to the user. This last characteristic allows for new libraries of characteristics to be sold as hardware additions, lessening the problem of unauthorized distribution.

The intended use of this invention is two-fold. When a birder carrying the device hears a bird of interest while observing birds in the field, they point the microphone of the device toward the calling bird and activate the identification function of the device. The device processes the sound and presents the results of the analysis to the birder. The possible results include that no bird was detected; that a bird was detected but the family could not be determined; that a bird was detected and the family was identified (and was so and so), but the species could not be determined; that a bird was detected, the family was determined (and was so and so) and the species was determined to be so and so.

Alternatively, the device can be used in backyard mode in which all incoming sounds are analyzed and when a bird is detected the device automatically proceeds with the identification process and records the results for the birder to review immediately or at a later time.

BRIEF DESCRIPTION OF THE DRAWINGS

These and other aspects of the invention will be better understood by reference to the drawings herein.

FIGS. 2A and 2B are elevation and side views of another alternate embodiment of the invention.

FIG. 5 is a waveform diagram and graph of a segment of a particular species of bird.

DETAILED DESCRIPTION OF THE INVENTION

Figure 1A:
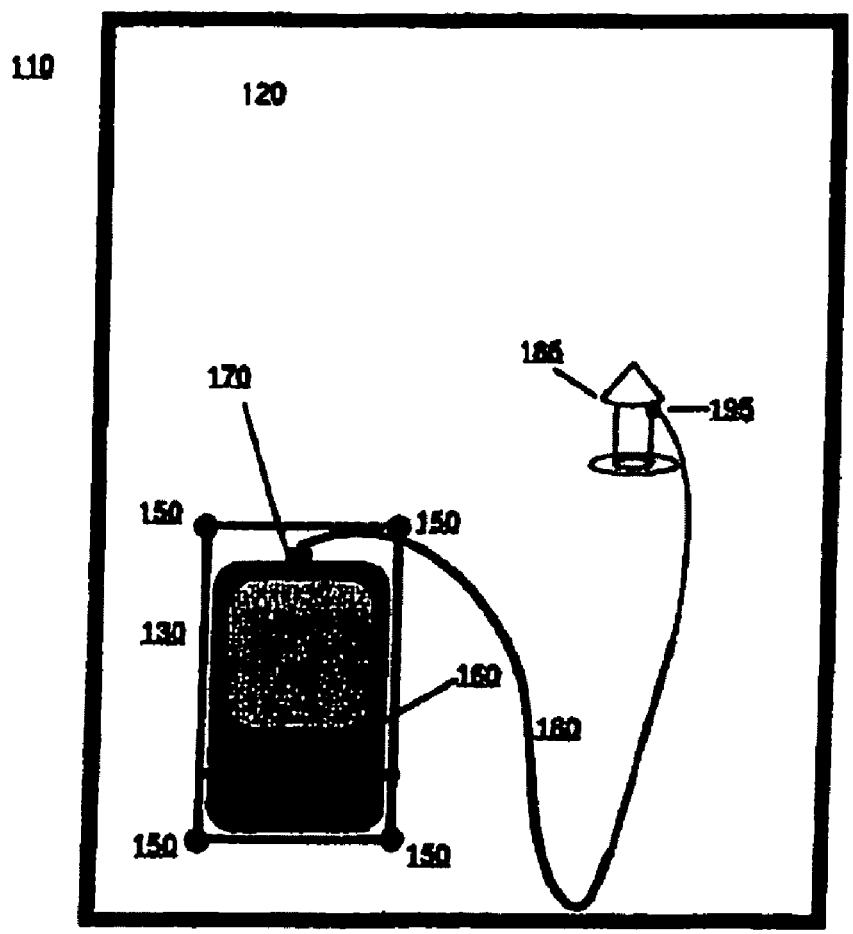
FIG. 1A is a pictorial elevation view of an embodiment of the invention.

FIG. 1A is a front view of the embodiment of the current invention in which the system is to be used inside a residence or other building to keep track of birds that come near the window. For example, if a birder has a bird feeder or other attractive feature outside their kitchen window, they may use this system to identify birds that come into their yard.

In this embodiment, holding cradle 130 is attached to the interior side of windowpane 120 of window 110 by suction cups 150 or other attachment mechanism. The purpose of the cradle 130 is to hold the handheld computational device 160 on the window so that it can be operated while looking out the window and yet be easily removed for maintenance including battery charging or using wired means of communication with other devices to, for example, exchange recorded bird identifications. Accordingly, there is a connector 170 that provides for a connection between the handheld computational device 160 including an audio capture means (not illustrated in this figure) and a contact microphone 190 through a microphone cable 180. The contact microphone 190 employs the entire windowpane 120 as a diaphragm, as is well known in the art, enhancing the sensitivity of the bird detection system. The connector 170 allows for the handheld computational device to be physically removed from the window location without also displacing the contact microphone.

Figure 1B:
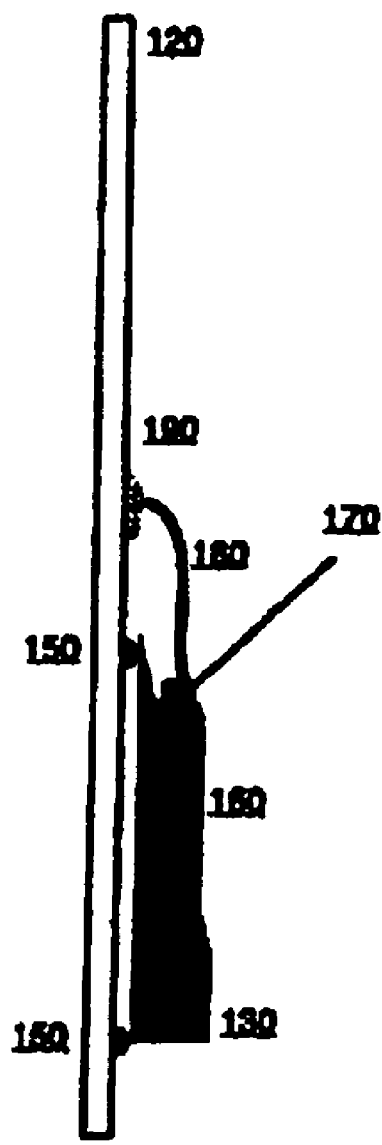
FIG. 1B is a side view of the embodiment of FIG. 1.

FIG. 1B illustrates a side view of the embodiment of the current invention in which the system is to be used inside a residence or other building to keep track of birds that come near the window. In particular, it illustrates the manner in which the contact microphone 190 is attached to the interior surface of the windowpane 120 and requires that the connector 170 be removed in order to remove the handheld computational device 160 from the cradle 130.

Figure 1C:
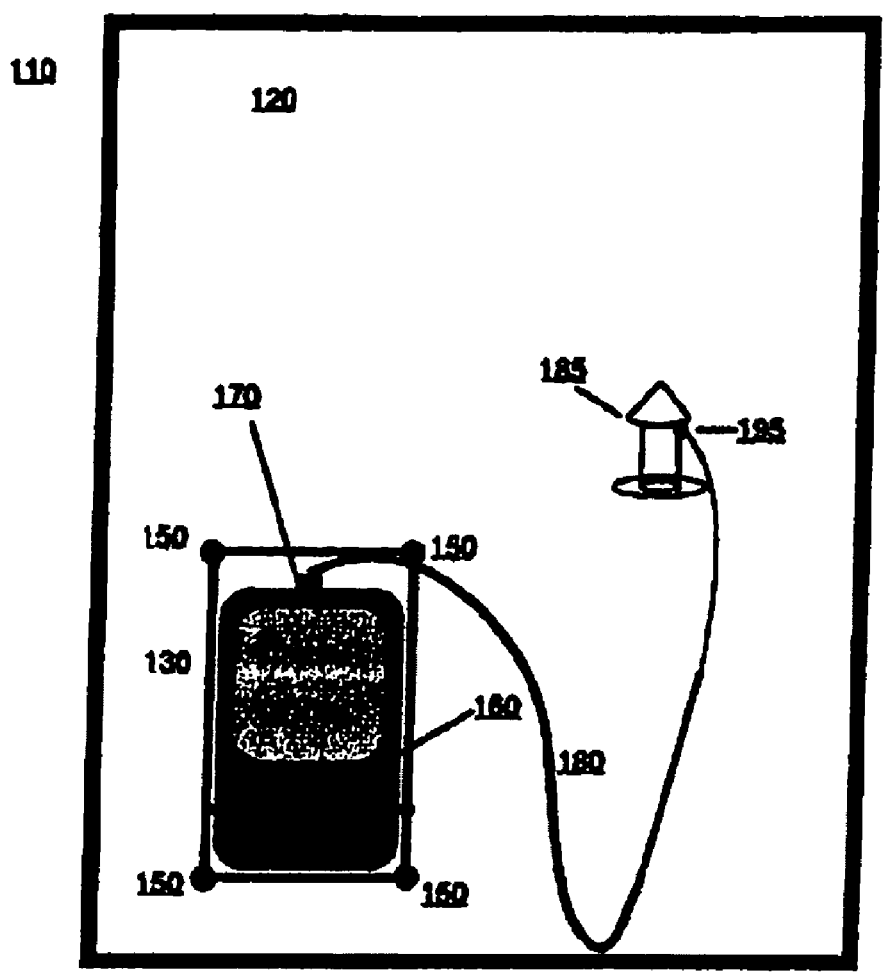
FIG. 1C is a pictorial elevation view of an alternate embodiment of the invention.

FIG. 1C illustrates an alternate embodiment of the current invention in which instead of being a contact microphone attached to the interior side of windowpane 120 of window 110, the sound receiver is an open air microphone 195 attached to a remote location such as a bird feeder 185 or the external side of windowpane 120 through an extended cable 180.

Figure 1D:
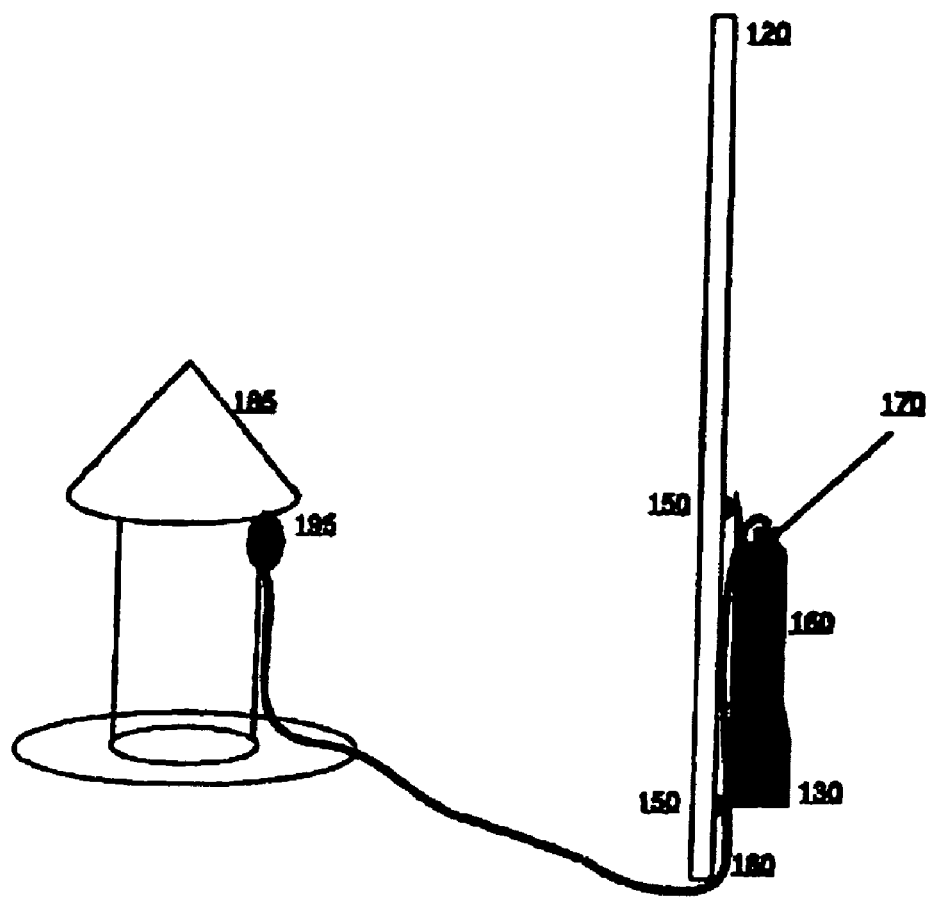
FIG. 1D is a side view of another alternate embodiment of the invention.

FIG. 1D illustrates another view of the embodiment of the current invention in which instead of employing a contact microphone attached to the interior side of windowpane, the sound receiver is instead an open air microphone 195 attached to a remote location such as a bird feeder 185 or the external side of windowpane 120 through an extended cable 180. In this embodiment the cable 180 is of the flattened type that can pass between the windowpane and the frame without damage.

FIG. 2 illustrates the embodiment of the current invention that provides for use of the invention in field conditions such as walking through a forest. It includes a hand-holdable cradle 230 that is used to secure both the handheld computational device 160 and a directional open-air microphone 290. The cradle includes attachment means 235 to hold the microphone in place and a connector 170 that allows the microphone cable 280 to be removed from the handheld computational device 160 including an audio capture means (not illustrated in this figure) to make it possible to remove the handheld device so that it may be used in other contexts such as charging its battery or connecting to other devices.

Figure 3:
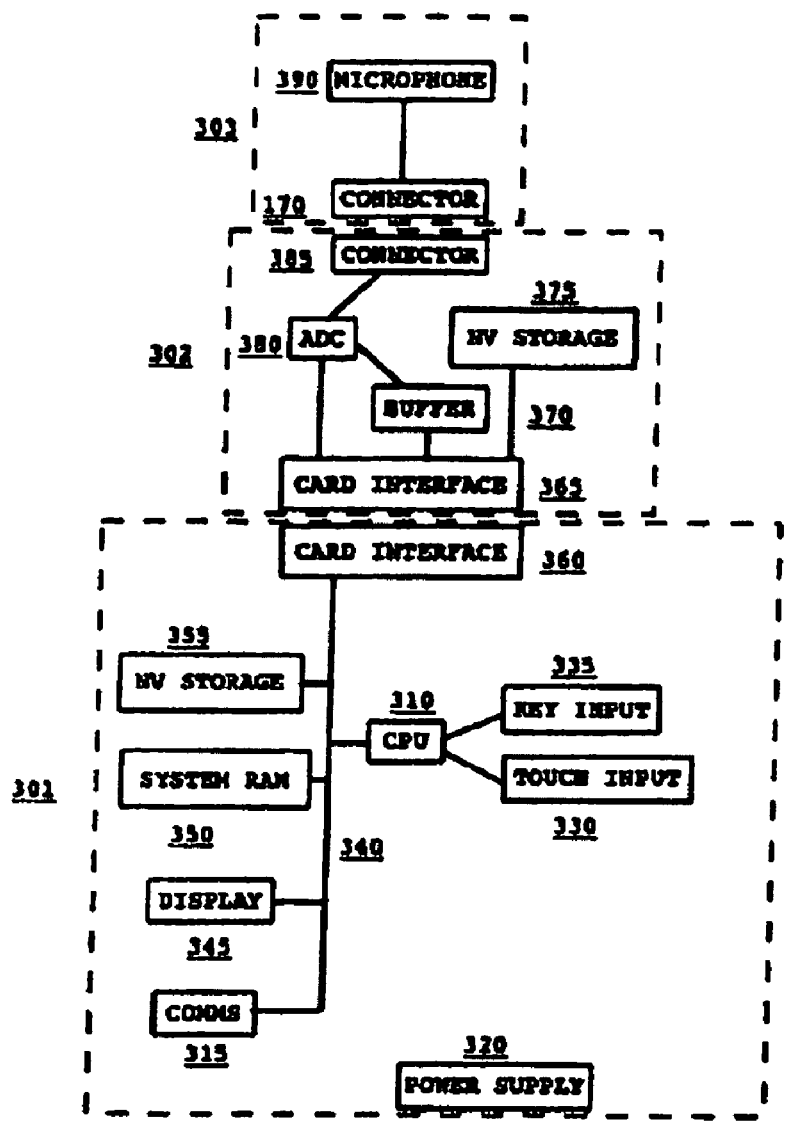
FIG. 3 is a block diagram of a preferred embodiment of the invention.

FIG. 3 illustrates the system block diagram of the preferred embodiment of the current invention. It shows a microphone subsystem 303 comprising microphone 390 with a cable terminating in a connector 170. The audio capture subsystem 302 is contained in a compact flash or secure digital input/output or other suitable case that allows it to be plugged into the extension slot of hand-held computational device 301. The audio capture subsystem 302 comprises a connector 385 that mates with microphone connector 170, an analog to digital converter 380, a random access memory buffer 380 wherein the result of the signal digitization are temporarily stored, non-volatile storage 375 such as flash memory in which is stored the data necessary for the family and species characterizations. These are connected to a card interface that includes control logic and power, data, and control signal connections in the usual way. Access to the non-volatile storage, and hence the data contained therein, should be through a proprietary control sequence rather than standard bus logic so users cannot readily copy the contents and distribute it to others.

The audio capture subsystem mates with a hand-held computational device 301 comprising an extension card interface 360, a system data bus 340, non-volatile storage 355 accessible to the user, a central processing unit 310, system random access memory 350, a user display 345, communication port 315, key input 335, (optional) touch screen input 330, and a power supply 320.

Figure 4:
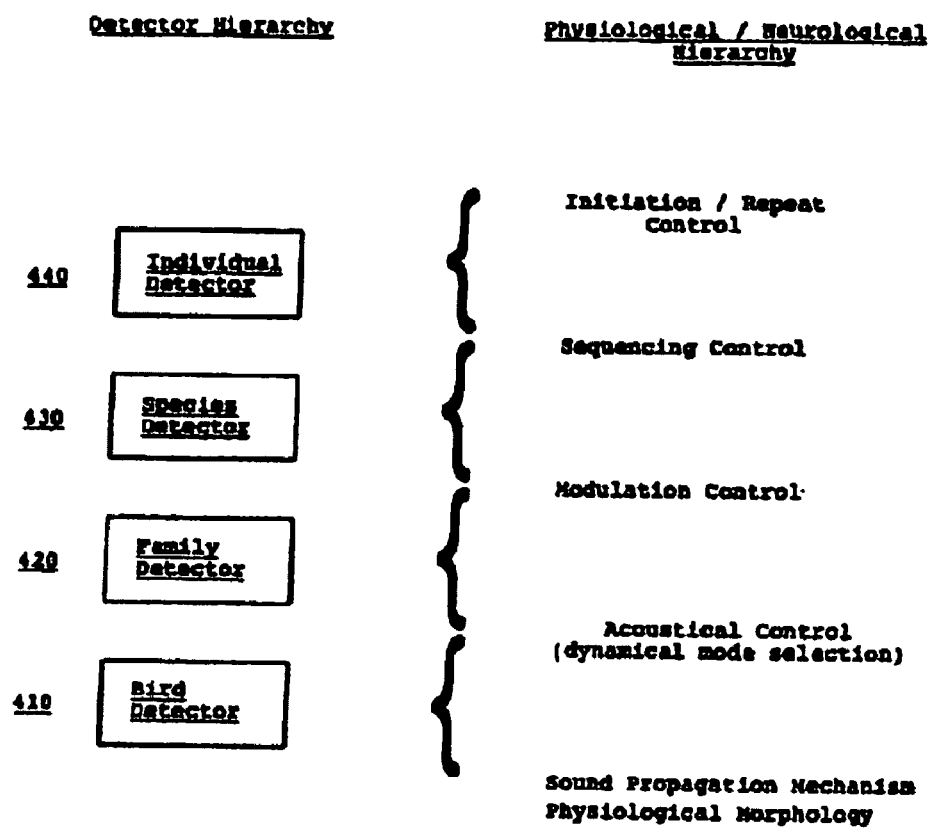
FIG. 4 is a diagram comparing the hierarchy of the components of the invention with physiological/neurological hierarchy of bird vocalization.

FIG. 4 illustrates the parallelism between the neuro-physiological hierarchy of bird vocalization and the hierarchy of detection means employed in the current invention. The lowest levels of the hierarchy correspond to aspects of bird vocalizations that change slowly even on evolutionary time scales. These map to the bird detection means, 410. One such aspect, and the one employed in the preferred embodiment, is the fact that birds have dual, substantially identical but independent, vibrating membranes in their syrinx. The corresponding audio characteristic of such a feature is used to establish that a bird was vocalizing at a particular time and providing fiduciary points for the next level of the hierarchy of analysis.

The next levels of the hierarchy correspond to aspects of bird vocalizations that change more rapidly on evolutionary time scales but are largely independent of the neural activity of the bird. These map to the family detection means, 420. One such aspect, and the one employed in the preferred embodiment, is the set of dynamical modes achievable by a bird's vocal tract. Just as a duck call (or, for that matter, a flute) has only a limited number of dynamical modes no matter how you play it, so too do bird vocal tracts, as evidenced by experiments in which the syrinx is excised as played independently of the bird. The corresponding audio characteristics of the dynamical modes are used to index potential bird families vocalizing at various time regions and to focus analysis at the next level on familialy coherent regions of the vocalization.

The next levels of the hierarchy correspond to aspects of bird vocalizations that are neurologically controlled, but at lower levels of the neurological control hierarchy. These stereotypical aspects evolve over many generations. These map to the species detection means 430. One such aspect, and one employed in the preferred embodiment, is the patterned sequence of shifts between dynamical modes. The corresponding audio characteristics, combined with the results of the other levels of analysis, allow for the rapid and sure identification of the family and species of a particular bird vocalization.

The next levels of the hierarchy correspond to aspects of bird vocalizations that are neurologically controlled and can change over the course of a bird's life FIG. 5 illustrates in schematic form the signal annotation process of the current invention. In this figure is shown a graph 610 of a segment of recorded vocalization of a screech owl. Highlighted in the graph are four regions 601, 602, 603, and 604 whose significance will be explained below. The illustration element 620 represents a region of memory containing the digitized signal as time-ordered samples.

The illustration element 630 represents the region of memory logically parallel to that represented in 620 but which contains the results of the bird detection means according to the current invention. Although one skilled in the art will realize that there are many ways to encode this information (for example, recording the start and stop times of positive results) for the purposes of illustration we will assume that the signal is represented by a copy of the original signal with the audio sample values replaced by detection result values. In this case, the highlighted signal region 601 is one in which the bird is apparently switching from vocalizing with one side of its syrinx to the other side. Hence in this region both sides of the syrinx will be in operation and the bird detection means will give a positive result as shown by the shaded is-bird region of 630.

The illustration element 640 represents a region of memory logically parallel to those represented in 620 and 630 but which contains the results of the family identification means according to the current invention. For purposes of illustration as above, we will assume here that the family signal is represented by a copy of the original signal with the audio sample replaced by family or dynamical mode index values. In the preferred implementation, the family identification means is preferentially applied to the region of the digitized signal around which the bird detection means has returned a positive result. In this way, the possibility of inappropriately applying the means to non-bird sounds is lessened. The bird detection signal thus provides time anchoring for the family, and eventually species, determinations. In this illustration there are three regions of the signal (highlighted in 602, 603, and 604) surrounding the positive bird identification region in which the family identification means has returned meaningful values. In region 602, the family identification means has found a dynamical mode, A, which is highly characteristic of the owl family. In regions 603 and 604, it has found a mode, B, which while not as characteristic, is consistent with the owl family.

The illustration element 650 represents a region of memory logically parallel to those represented in 620, 630, and 640 but which contains the results of the species identification means according to the current invention. For purposes of illustration as above, we will assume here that the species signal is represented by a copy of the original signal with the audio sample replaced by species values. In the preferred implementation, the species identification means examines broader characteristics of the signal in a region including and surrounding regions consistent with a single family to determine the identity of the species in question. In the illustrated case it has determined that the entire region corresponds to a vocalization of a screech owl.

Figure 6:
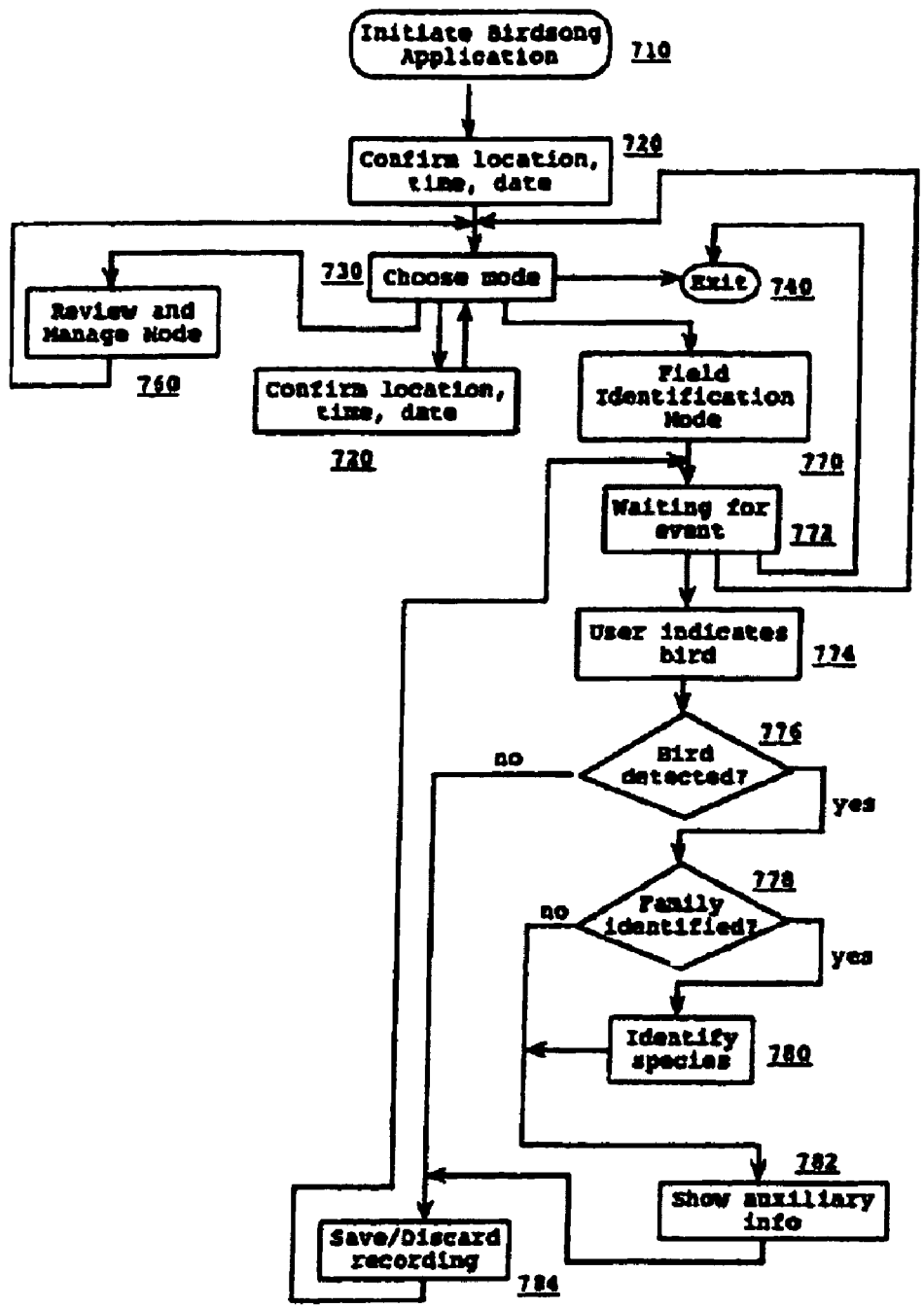
FIG. 6 is a functional block diagram of the software employed in the computational device according to the present invention.

FIG. 6 illustrates functional blocks of the software application to be employed on the handheld device in the current invention for field use. Upon user initiation of the application, represented by block 710 in FIG. 6, the application moves to process block 720 in which the user is presented with the current status of the time, date, and location and the user is enabled to confirm the current settings or revise them.

For the location data, the user may be presented with a scrollable map with the last known position marked and allowed to select, graphically, a new location. Alternatively, the user may enter geographic coordinates (or import them from a GPS or other positioning system), or select from a list of known places. The date, time, and location information is used in the system in two ways. First, it is used to annotate any recorded bird events so that the time, date, and location will be available along with other information about the event. Second, it is used to prioritize the list of candidate bird families and species to be considered as candidates in an identification attempt. To prioritize the list of candidates, a probability function for each family and species, constructed in the usual way from report densities and stored with the software, is evaluated on the time, date, and location data. The value of that probability serves as the ranking index of the family and species. This ranking is used to sequence the process of identification with the more probable candidates being examined first, although no candidates are ruled out on the basis of the time, date, and location data.

The application then proceeds to choose block 730 in which the user can select among modes of operation. In particular, the user may choose to enter a mode in which they can manage the list of identifications they have accumulated, exchange data with another device, and so on. This is represented by process block 760 and is described in more detail in another figure. Alternatively, the user may review and revise their location, time and date (process block 720,) enter field identification mode (process block 770) or exit the application (exit block 740.)

Actual bird identification is enabled when the user enters field identification mode (process block 770.) When this mode is entered, the application activates the audio digitization means (see FIG. 3) including an analog to digital converter and associated buffer. In field identification mode, the audio digitization means is then continuously recording (and, eventually, discarding) incoming sound and must therefore be draining power from the system, which can pose a problem for field use if unmanaged. It is thus important that the recording means be deactivated when exiting field identification mode either to choose another mode (process block 730) or to exit the application (exit block 740.)

After entering field identification mode, the application proceeds to process block 772 in which it waits for the user to indicate that they are hearing, or just have heard, a bird they wish to have identified, that they wish to change mode, or that they wish to exit the application. In case they wish to identify a bird, the application proceeds to process block 774 in which the currently recorded (that is, already digitized and present in the buffer 370 of FIG. 3) signal is transferred out of the continuous recording buffer and into system memory where it can be examined without interfering with the operation of the recording means. It also queues up the process of transferring later blocks of recorded sound to system memory as they are required by the identification process and become available from the recording means. The application then proceeds to the decision block 776. In this block, the application calls on the bird detection means to examine the currently recorded sound to establish whether or not a bird's vocal production is apparent in the recording.

In the preferred embodiment of this invention, this detection means looks in the signal for a pair of an harmonically related spectra that are shaped by the same resonant cavity. If no bird is detected, the application proceeds to process block 784 in which the recording in system ram can be saved or discarded (in this case discarded), any pending transfer queues are cancelled, and the user is informed of the result (negative in this case.) The purpose of aborting the search as early as possible under these conditions is three-fold. First, it gives immediate feedback to the user that the current conditions are unlikely to yield valuable results and thus train them more quickly to choose favorable over unfavorable conditions as best they can. Second, it allows the user to attempt another identification as soon as possible, without waiting for the (possibly lengthy and likely unsuccessful) repeated attempts at comparing with less and less likely family and species candidates. Third, in the case where bird characteristics are not present anywhere in the sample, the search for a family and species, if successful, is more likely to return spurious results than would be desirable.

If, on the contrary, a bird's vocal production is apparent in the recording, the application proceeds to decision block 778. In this block, the application calls on the family identification means to examine the currently recorded sound near the time points at which the bird detection means has indicated that a bird's vocal production is apparent. This use of the bird detection means helps insure that the family identification means does not waste resources in trying to determine the bird family corresponding to a sound that was not produced by a bird. In the preferred embodiment, the family identification means employs a dynamical synchronization method to suggest to which family, if any, among the families whose representation is available to the application, this bird belongs. The dynamical synchronization method, most widely used in the field of communications through chaotic systems, couples the output signal of an unknown dynamical system to one or more models of dynamical systems and determines by the degree of synchronization of each model to the signal which model best represents the unknown system. For example, in the communication method known as chaos-shift keying, at any given time the message transmitter selects the output of one of two predetermined chaotic dynamical systems to be transmitted. The receiver couples the incoming signal to two model dynamical systems and determines which synchronizes to the incoming signal. In the current application to bird families, there will be one or more dynamical models for each family corresponding to the modes of oscillation that family employs.

In the case that the family is not successfully identified, the application proceeds to process block 782 in which the failure is reported to the user along with such additional information as may be desirable to the user. This information would include, for example, which families were considered and the degree of evidence discovered for each. The application then proceeds to process block 784 in which the user chooses whether to save the recorded sound in more permanent data storage for later analysis or, instead, to discard it.

In the case in which the family has been successfully identified, the application proceeds to process block 780 in which the species identification means is employed on the part of the recording around that in which the family was identified. This successive scoping aids in the identification process by focusing attention on the most relevant, and coherent, parts of the recording thus lessening the problems due to overlapping songs from other birds, or other interfering background noise. The candidate species to consider are determined by the family identified and prioritized for consideration by their likelihood of occurrence correlated to the time, date, and location. In the preferred embodiment, the species is identified by matching larger-scale characteristics of the sound against those characteristics of the candidate species. These characteristics include the time-base of the sound (characteristic frequency and duration of a phoneme or indecomposable unit) and which dynamical mode switches occur in what order. Whatever the results of these comparisons, the application then continues to process block 782 in which the results of the process are reported to the user. The application then continues to process block 784 described above and then back to block 772 to await another event.

Figure 7:
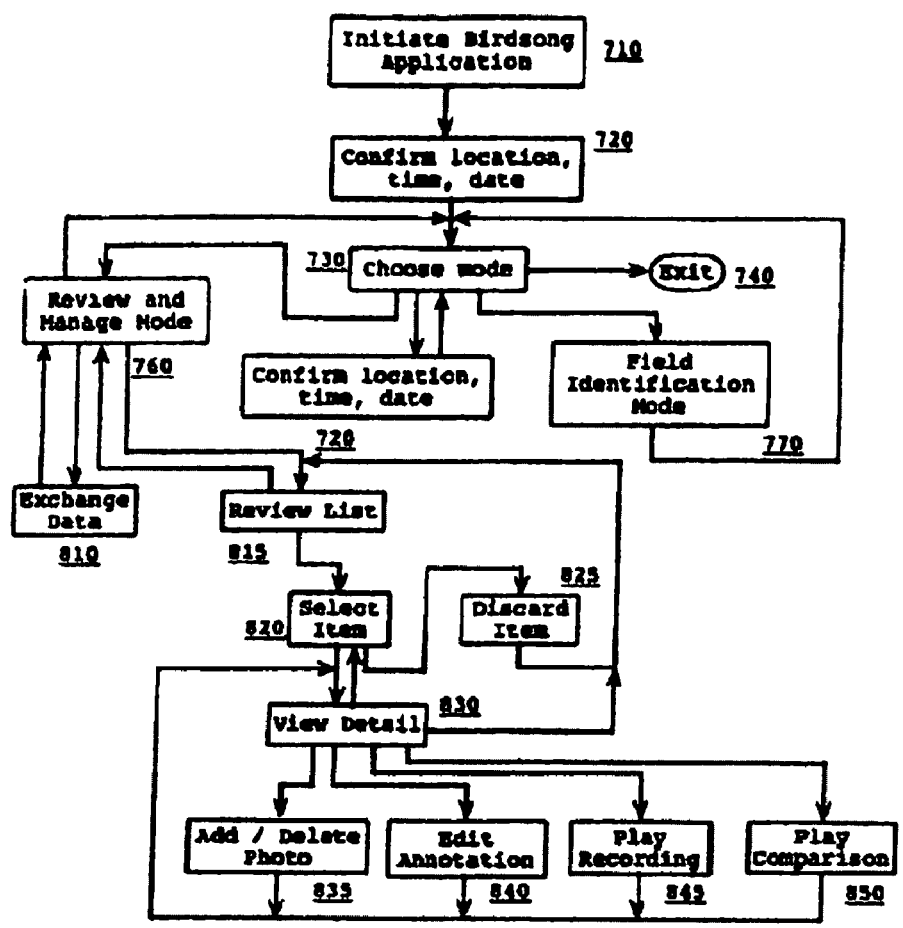
FIG. 7 is an additional block diagram of a subset of the software used in the present invention.

FIG. 7 illustrates additional detail of functional blocks of the software application to be employed on the handheld device in the current invention for field use. In particular, it illustrates the functional blocks associated with mode in which the user can review and manage the collection of captured identification results they have saved and exchange data with another, suitably arranged, computing device such as a laptop or desktop computer or remote server. In process block 760, the user chooses whether they would like to exchange data, review their list, or choose another mode. In the final case, the application continues to process block 730, previously described. In the first case, the application continues to process block 810 in which the well-known desktop or remote server synchronization process is undertaken. In this specific case, the recordings and related information the user has accumulated on their handheld device through the use of this invention but not yet archived is transmitted in the usual way to the desktop or other device and archived there. Similarly, data for use with the family and species identification means, or updates to the application, which is present on the desktop or other device but not presently installed on the handheld are transmitted to the handheld and incorporated into the system. Once the user's data has been transmitted for archive, this fact is noted with the data so that the user can more easily decide which items they can delete on the handheld without losing them completely.

In the case that the user indicates that they would like to review their list, the application proceeds to process block 815 in which a scrolling or otherwise paginated list of items with short identifying information is presented to the user. In addition to scrolling or paging through the list, the user can either leave this mode, in which case the application proceeds to process block 760, or select an item from the list represented here by process block 820. Once an item has been selected, the user can either discard an item (process block 825) and return to review list process block 720, or view details of that item (process block 830.) In process block 830 all the saved information about the identification attempt is presented to the user including the time and date, the location, the bird family (if successfully identified,) the bird species (if successfully identified,) the recorded sound (if the user chose to save it,) and whether this item has been archived. From here the user can choose (835) to add or delete a photo or other image file to this item (so that if they also took a photo of this bird when they identified it, they can add this to their record of the event). Similarly, they can choose (840) to add or edit a text annotation to this item (so if they made other observations of interest such as the surrounding in which the event occurred, they can record this as well). If in addition, the user's device is appropriately configured to allow for playback of sound recordings and if the user chose to save the recorded data, they may choose (845) to play back the recorded sound. If, in addition, the user has other sound recording installed on their device in the usual way they can choose (850) to play one or more of those for comparison.

In an extension of this invention, the application here described can be integrated with a more typical electronic field guide containing descriptions, identification marks, photos or drawings, and sample sound recordings. In particular, the species or family information can be used as in index into the electronic field guide so that all the addition information available from the field guide can be viewed here as well.

Figure 8:
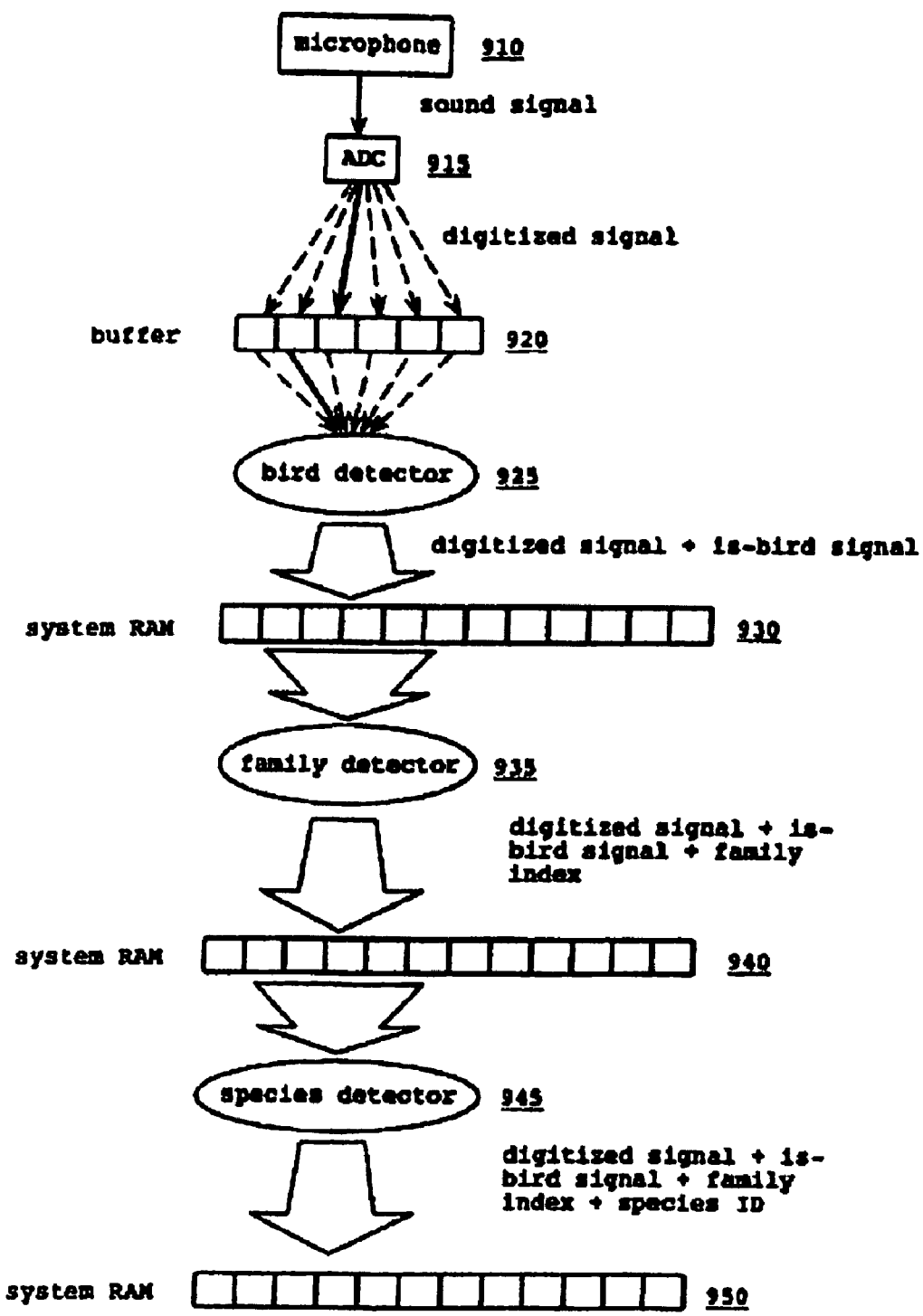
FIG. 8 is a diagram of dataflow through the components of the present invention.

FIG. 8 illustrates the dataflow aspects of the current invention when deployed for unattended operation, for example for use inside a residence as illustrated in FIGS. 1A-1D. This embodiment does not require the user to indicate to the system that the user is hearing, or has just heard, the song of a bird of interest. It must, therefore, make the determination of the presence of a bird of interest on an ongoing basis. Accordingly, all the processes shown in FIG. 8 operate concurrently to form a processing pipeline, as illustrated.

Those skilled in the art will recognize that such effective concurrency is often achieved through multiple threads of programmatic control that time-share a single central processing unit rather than employing multiple processing units actually operating in parallel.

In operation, sound, including bird-produced sound, enters microphone 910 and is converted to a continuous electrical sound signal that passes to analog-digital converter (ADC) 915. Here, the signal is converted, in the usual way, to a digitized signal by sampling the signal periodically and recording each sample as a digital quantity in successive locations in a RAM buffer 920. In the preferred embodiment, the ADC is a separate processor that operates independently of the central processing unit and takes samples approximately 44,000 times per second, and records each sample as a 16 bit quantity. In the preferred embodiment, the RAM buffer 920 is separate from system RAM, is directly addressable by the ADC 915, is capable of storing approximately 6 seconds of recorded audio, and is operated as a circular buffer. That is, after the ADC 915 records a sample at the last available 16-bit block in the buffer, it continues recording at the first available location, overwriting the sample already in that location.

The purpose of the buffer is to allow ADC 915 to continue to record sound uninterrupted even while the central processing unit is occupied with one or another of the other processes described here.

From the buffer 920, the digitized signal flows to the bird detector process 925. In the preferred embodiment, the bird detector process 925 is carried out by the central processing unit and employs the bird detection means. In the bird detector process, the digitized signal is transferred out of the buffer 920 and analyzed with a sliding window methodology. That is to say, the incoming signal is treated as a sequence of overlapping blocks (windows into the signal data,) each approximately one half second in duration. The bird detection means is applied to a block and the result is recorded, keyed to that block. The next block to be analyzed is formed by adding one or more subsequent later samples to the block and removing the same number of earlier samples from the block. Both the digitized signal and the results of the bird detection process keyed to the signal are stored by the bird detector process into a known region of system RAM 930 for additional processing.

In the preferred embodiment, the bird detector process discards, before saving into system RAM 930 any parts of the digitized signal that are not within approximately 3 seconds of a window in which a bird was detected. This approach solves the problem that, in typical unattended conditions, there may be hours that go by without any bird vocalizations and without this mechanism, system RAM would fill up with useless data. With the current invention, after any number of hours of operation without bird vocalizations, at most 3 seconds of data would be accumulated into system RAM.

From the region of system RAM 930 in which the bird detector process stored the relevant parts of the digitized signal along with the results of the bird detection analysis, the data flow to the family detector process 935. In this process, family identification data are generated from the family identification means applied to the digitized signal and bird detection data. The resulting family index data are keyed to the digitized signal and both are written to a known region of system RAM 940 to enable further processing. In the preferred embodiment, the family detector process 935 is carried out by the central processing unit and employs the family identification means. In this embodiment, the family detector process locates family-associated dynamical modes in the signal surrounding the time windows in which a bird vocalization has been detected. It does so by determining which of the dynamical models available to the application will synchronize with the time regions of the signal. The time sequence of these synchronizing models constitutes the family index of the signal over time.

From the region of RAM 940 in which the family detector process stored the relevant parts of the digitized signal along with the result of the family identification analysis, the data flow to the species detector process 945. In this process, species identification data are generated from the species identification means applied to the digitized signal and family index data. The resulting species identification data are keyed to the digitized signal and both are written to a known region of system RAM 950.

Figure 9:
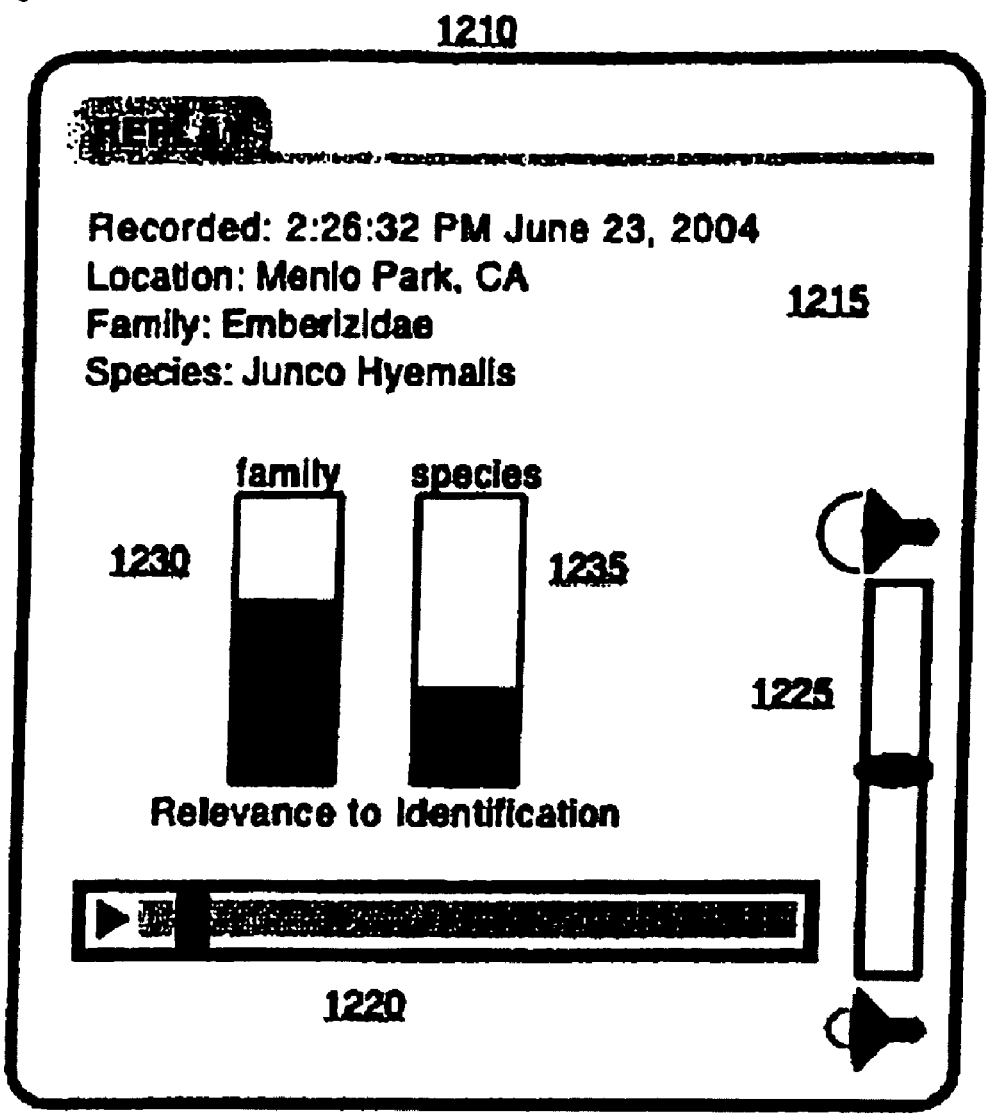
FIG. 9 is an illustration of a display provided by the computational device for a specific species of bird.

FIG. 9 illustrates the salient features of the bird song replay aspect of the software application in accordance with the current invention. An important element of the utility of the current invention is to assist birders in their ability to learn bird songs themselves. Because both the family index data and the species identification data are stored with, and keyed to, the digitized recorded signal, an abstract of this information can be displayed to the user in synchrony with the audio replay of the song itself. This allows the user to learn for themselves which elements of the bird's vocalization were most important for the identification of the family and species and therefore, to learn which elements to listen for to improve their capacity to identify birds for themselves. Although there have long been bird illustrations in field guides that include arrows or other methods to highlight visual characteristics most relevant to the identification of a species, prior to this invention there was no effective method to emphasize the elements of a bird's vocalization that are relevant to the identification, and certainly no method that enabled those elements to be emphasized in a just-made recording in the field.

FIG. 9 represents a possible screen shot of the display 1210 of the personal computational device on which the software application is running and the user has selected a recording for replay. The recording information 1215 is shown typically including the time, date, and location of the recording, and the family and species determination (if any) that was made in accordance with the current invention. Also shown are typical replay controls including a volume control 1225 and a play bar 1220 that allows the user to start, stop, rewind, and select a time in the recording. In addition to these typical elements, there are indicators 1230 and 1235 of the relevance of the time block of the recording immediately surrounding the current time point of the playback to the identification of the family and the species, respectively. Thus, at any time around which a dynamical mode characteristic of the family has been identified, the family relevance bar will be high. If this is not the case, the bar will be low. At any point near a mode transition characteristic of the species or in a time region in which the song is undergoing a smoother parameter change (an upward sweep of frequency, for example) that is characteristic of the species, the species relevance bar will be high and otherwise it will be low. In an alternate implementation in accordance with the current invention, the two types of information can be merged (say, summed) into a single display of relevance. In a further elaboration, this same relevance signal can be used to alter the volume control during the replay so that those parts of the song most relevant to identification are played at a higher volume level, while those less relevant are played at a lower volume level.

What is claimed is:

1. A method for learning to identify birds by their song comprising:
    storing a bird's song in memory device;
    storing audio feature relevance data, audio family index data and audio species identification data temporally correlated to said bird song in a memory device;
    selecting the stored bird song for replay; and
    replaying the selected bird song on an audio device while displaying the correlated data and the degree of relevance of the data to the identification of the bird family on a display device.

2. The method of claim 1, wherein the step of replaying the selected song and displaying the correlated data on a display device includes displaying the degree of relevance of the data to the identification of the bird species.

3. The method of claim 2, including the step of controlling the replay of the stored bird's song to select portions of the song with high relevance to the bird's species.

4. The method of claim 3, including the step of selecting a specific time point of the stored song.

5. The method of claim 4, including the step of displaying the relevance of the selected time point to the identification of the family and species of the bird.

6. The method of claim 5 including the step of displaying the relevance of the selected time point to the identification of the species of the bird.

* * * * *